(12) United States Patent
Vollenkemper

(10) Patent No.: US 9,802,724 B2
(45) Date of Patent: Oct. 31, 2017

(54) APPARATUS AND METHOD FOR PROCESSING OPEN-MOUTH BAGS

(71) Applicant: HAVER & BOECKER OHG, Oelde (DE)

(72) Inventor: Willi Vollenkemper, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 212 days.

(21) Appl. No.: 14/442,941

(22) PCT Filed: Nov. 13, 2013

(86) PCT No.: PCT/EP2013/003408
§ 371 (c)(1),
(2) Date: May 14, 2015

(87) PCT Pub. No.: WO2014/075793
PCT Pub. Date: May 22, 2014

(65) Prior Publication Data
US 2015/0266601 A1    Sep. 24, 2015

(30) Foreign Application Priority Data
Nov. 14, 2012 (DE) .................. 10 2012 022 224

(51) Int. Cl.
| B65B 1/04 | (2006.01) |
| B65B 43/46 | (2006.01) |
| B65B 43/30 | (2006.01) |
| B65B 43/60 | (2006.01) |
| B65B 1/08 | (2006.01) |

(Continued)

(52) U.S. Cl.
CPC .............. *B65B 43/465* (2013.01); *B65B 1/04* (2013.01); *B65B 1/08* (2013.01); *B65B 9/00* (2013.01); *B65B 39/00* (2013.01); *B65B 43/30* (2013.01); *B65B 43/50* (2013.01); *B65B 43/60* (2013.01); *B65B 61/28* (2013.01); *B65G 47/847* (2013.01);
(Continued)

(58) Field of Classification Search
CPC ........ B65B 43/60; B65B 43/50; B65B 43/465
See application file for complete search history.

(56) References Cited

U.S. PATENT DOCUMENTS

| 3,961,461 A | 6/1976 | Ruf et al. |
| 7,162,852 B2 | 1/2007 | Eder |

(Continued)

FOREIGN PATENT DOCUMENTS

| CN | 201721647 U | 1/2011 |
| DE | 3416155 A1 | 1/1985 |

(Continued)

*Primary Examiner* — Jason K Niesz
(74) *Attorney, Agent, or Firm* — Pearne & Gordon LLP

(57) ABSTRACT

Apparatus and method for processing open-mouth bags comprising a handling device for exchanging open-mouth bags with a rotary packaging machine. The handling device comprises a rotating device that circulates around a rotation axis of the handling device and is provided with two gripping arms for gripping the open-mouth bags. The two gripping arms are disposed for separate, longitudinal movement transverse to the rotation axis of the rotating device to enable longitudinal movement of the gripping arms relative to the rotating device in addition to the circulating motion around the handling device.

24 Claims, 8 Drawing Sheets

Figure 1:
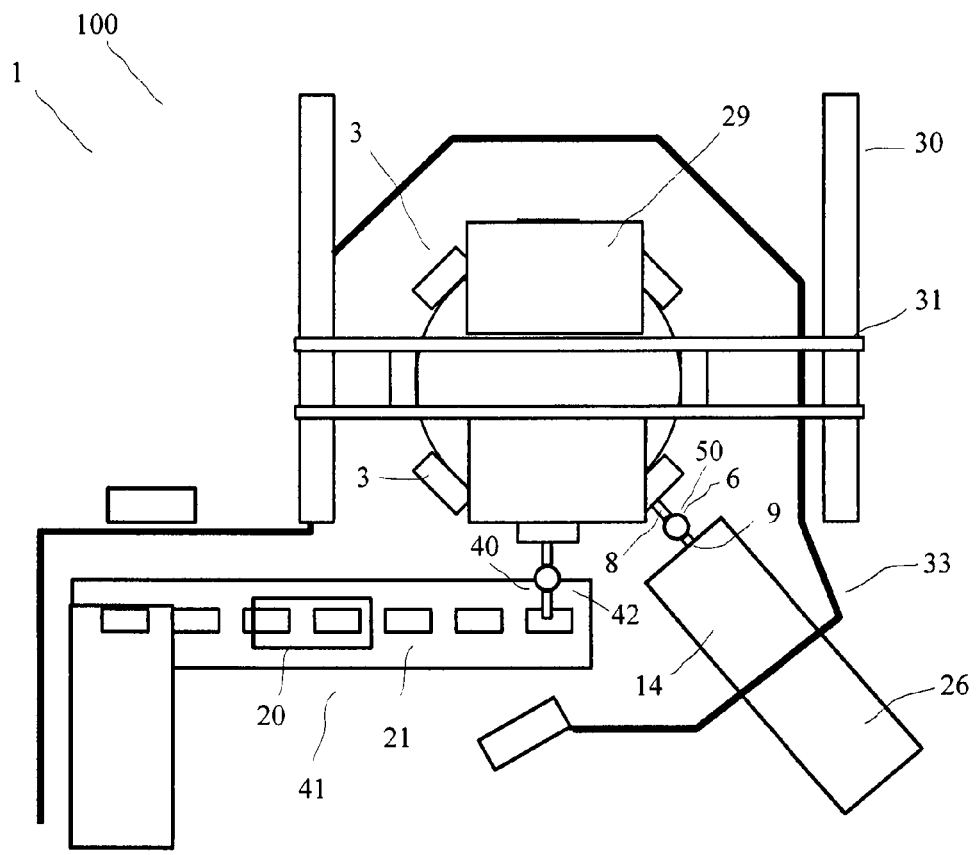

(51) Int. Cl.
  *B65B 9/00*       (2006.01)
  *B65B 43/50*      (2006.01)
  *B65B 61/28*      (2006.01)
  *B65G 47/86*      (2006.01)
  *B65B 39/08*      (2006.01)
  *B65B 65/02*      (2006.01)
  *B65B 39/00*      (2006.01)

(52) U.S. Cl.
  CPC .............. *B65B 39/08* (2013.01); *B65B 65/02* (2013.01); *B65B 2039/009* (2013.01)

(56) References Cited

U.S. PATENT DOCUMENTS

| | | |
|---|---|---|
| 8,079,200 B2 | 12/2011 | Tsutsui et al. |
| 9,346,568 B2 | 5/2016 | Korte et al. |
| 2005/0229550 A1 | 10/2005 | Eder |
| 2009/0233778 A1 | 9/2009 | Tsutsui et al. |
| 2011/0318147 A1* | 12/2011 | Setozaki ................ B65G 47/90 414/411 |
| 2014/0083559 A1 | 3/2014 | Korte et al. |

FOREIGN PATENT DOCUMENTS

| | | |
|---|---|---|
| DE | 3539470 A1 | 7/1986 |
| DE | 10235929 A1 | 3/2004 |
| DE | 102011101040 A1 | 11/2012 |
| EP | 0778206 A2 | 6/1997 |
| EP | 2100813 A1 | 9/2009 |
| WO | 2004014729 A1 | 2/2004 |

* cited by examiner

APPARATUS AND METHOD FOR PROCESSING OPEN-MOUTH BAGS

The present invention relates to an apparatus and a method for processing open-mouth bags providing a handling device for exchanging open-mouth bags with a rotary packaging machine. The packaging machine may be provided for bagging any type of dry bulk goods. This apparatus according to the invention is particularly preferred in bagging fine-grain products, i.e. when bagging fine and dusty products requiring lengthy filling and in particular compacting times. The apparatus according to the invention may comprise such a rotary packaging machine.

A great variety of packaging machines for filling open-mouth bags have been disclosed in the prior art. For example so-called FFS packaging machines ("Form Fill Seal packaging machines") tend to be used for filling bulk materials into open-mouth bags. In these FFS packaging systems the open-mouth bag is manufactured on the machine or in a device immediately upstream. The machine has a roll of tubular sheet assigned to it from which open-mouth bags are continuously manufactured during operation as required. An advantage of these FFS packaging machines is that the open-mouth bags can be manufactured in the lengths actually required. There is no need to use prefabricated and thus more expensive bags.

FFS packaging machines process open-mouth bags of plastic sheets which may be waterproof. This is why open-mouth bags filled with hygroscopic materials—such as cement—are suitable for open-air storage after closing since their contents are reliably protected from moisture.

For increasing the filling rate, packaging machines for filling open-mouth bags have been disclosed which are rotary in construction, comprising multiple filling spouts distributed over the circumference to which open-mouth bags are appended for filling. To ensure reliable appending of the bags to the filling spouts, a known packaging machine for filling open-mouth bags having four filling spouts is rotated indexed by 90° and then stopped. During the stop the open-mouth bag is appended to the filling spout from beneath while the filling process is already ongoing for the next filling spout. The indexed operation of such a rotary packaging machine allows an extended compacting period. Namely, while an open-mouth bag is being appended to the first filling spout, other filling spouts may already be in the filling process while vibrating devices simultaneously act on the partially filled open-mouth bags to lower the product level and deaerate the filled bulk materials. Lowering the product level allows to reduce the bag lengths so as to save costs. Moreover, compacted bags are optically more appealing after closing than bags still containing large volumes of excess air.

To attain high throughput when filling bulk goods into open-mouth bags, the open-mouth bags to be filled are automatically placed onto the filling spout and automatically discharged after the filling process. Placement provides for placing a pre-opened open-mouth bag from beneath by way of a swiveling motion of a floating gripper. In stationary systems such placement is reliable. Basically this is also possible in indexed rotary systems since the filling spouts are stationary during placement. However, when a packaging machine is operated rotating continuously then the brief point in time of rotating past is not sufficient for these bag placers to append the pre-opened bag onto the filling spout. The reason is among other things, the sheet material used for the open-mouth bags whose inherent stiffness is not sufficient to ensure adequate shape retention, given the prevailing necessary proceeding speeds.

Packaging machines for filling open-mouth bags configured to rotate have also been disclosed in the prior art. The open-mouth bags intended for filling are transferred to the rotary packaging machine by means of floating grippers which transfer the empty bag hanging down flat, to packaging machine grippers rotating along. Each filling unit of the packaging machine is provided with a bag opener that opens the upper bag walls lying on top of one another and makes an opening into the upper bag wall adapted to the filling spout. Although this packaging machine is basically functional its construction is very complex since each single filling spout must be provided with a separate bag opener.

For filling bulk goods into valve bags, packaging machines have been disclosed where the packaging machines are configured rotary and where the valve bags intended for filling are shot onto the filling spouts while the packaging machine is rotating. The filling mouths of valve bags are considerably smaller than those of open-mouth bags and they tend to comprise at least one paper layer that causes the valve bag and in particular the valve to be very stiff. Moreover, the filling spouts in rotary valve bag packaging machines extend approximately horizontally radially outwardly and the valves of the valve bags are shot from radially outwardly onto the horizontally aligned filling spouts. During placing or pushing on the valve bags bridge a radial distance between the bag placer and the filling spout in free flight. This is to avoid collision of the stationary bag placer with the rotating portion of the system. This method works reliably with valve bags since valve bags show a comparatively high inherent stiffness and since the cross section opening of the bag valve is small so that valve bags show sufficient stability for the distance to be overcome in free flight.

Open-mouth bags, however—as the name indicates—are constructed open on top. Also the filling spouts used are considerably larger in cross-section. Since open-mouth bags moreover tend to consist of highly flexible sheet materials, the bag opening required for placing must be given defined support during the placing process so as to ensure defined transfer of the open-mouth bag intended for filling and a precisely defined seat of the open-mouth bag at the filling spout. Therefore it is not readily possible to bridge even a comparatively small distance in free flight when placing an open-mouth bag onto a filling spout.

Moreover, when filling fine-grained bulk goods into open-mouth bags, a vibrating plate is as a rule used on which the bottom of the open-mouth bag is resting during the filling process. In this way a linear placement onto a filling spout of an open-mouth bag machine is not readily possible from beneath since the vibrating plate is positioned exactly beneath the filling spout.

In analogy, while automation is also desired for discharging filled open-mouth bags the requirements are also increased over discharging valve bags.

It is therefore the object of the present invention to provide an apparatus for processing open-mouth bags comprising a handling device for exchanging open-mouth bags with a rotary packaging machine while also allowing a high throughput even when bagging fine-grain bulk goods.

This object is solved by an apparatus having the features of claim 1 and by a method having the features of claim 19. Preferred specific embodiments are the subjects of the respective subclaims. Further advantages and features of the present invention can be taken from the general description and the description of the exemplary embodiment.

The apparatus according to the invention for processing open-mouth bags comprises a handling device for exchanging open-mouth bags with a rotary packaging machine. The handling device comprises at least one rotating device circulating about a rotation axis of the handling device with at least two gripping arms for gripping the open-mouth bags being disposed on the rotating device. The at least two gripping arms are disposed separate from one another for longitudinal movement substantially transverse to the rotation axis of the rotating device to enable longitudinal movement of the gripping arms relative to the rotating device in addition to the circulating motion around the handling device.

The apparatus according to the invention has many advantages. The apparatus according to the invention allows to exchange open-mouth bags to be filled with a rotary packaging machine having multiple filling spouts. The handling device is equipped with a rotating device which is provided with at least two, three or more gripping arms. This allows the handling device to efficiently exchange open-mouth bags with the rotary packaging machine. To synchronize the motions of the gripping arms of the handling device with the motions of the rotary packaging machine the gripping arms are disposed on the rotating device to be movable in the longitudinal direction. This means that the handling device on the whole may be provided for example stationary. Optionally the position of the handling device is adjustable.

The apparatus according to the invention allows to reliably exchange even open-mouth bags of flexible film materials.

The circulating rotating device provided on the handling device includes at least two gripping arms which serve to exchange open-mouth bags with the rotary packaging machine. The two gripping arms are disposed separately from one another for longitudinal movement to enable at least temporarily synchronous movement with the rotary packaging machine.

All the configurations preferably provide for processing open-mouth bags showing filled weights of 4 kg to 60 kg and in particular between approximately 10 and approximately 50 kg. The open-mouth bags to be processed are not provided to stand upright and as a rule they are not self-standing on their narrow ends after filling.

The gripping arms are in particular longitudinally movable at least in one plane transverse to the rotation axis and in particular approximately in a horizontal plane. A slight inclination to the horizontal may be given. Preferably at least one driving device is provided for the longitudinal movement of at least one gripping arm. It is possible and preferred for the driving device to be provided for two or more gripping arms performing in particular separate or independent longitudinal movements. Or else it is also possible to dedicate a separate driving device for each of the gripping arms.

Particularly preferably the driving device can be coupled by means of at least one coupling device to at least one movement device for longitudinal movement of the gripping arm. The coupling device is in particular controlled forcibly or separately. A coupling device with which to selectively couple a movement device to the driving device allows a simpler structure since only one single driving device need to be provided for two or all of the gripping arms.

Although one driving device only is provided by way of an electric motor, a synchronous motor, an electric cylinder, or a position-controlled hydraulic or pneumatic cylinder, the coupling device allows to intentionally obtain separate longitudinal movements of the gripping arms. This reduces the complexity of the rotating device since the number of drives and control and supply lines connecting with the rotating device is reduced.

It is therefore preferred to configure the coupling device for coupling the driving device to at least two different movement devices. This allows to obtain separate longitudinal movements of at least two different gripping arms.

Preferably at least one movement device comprises a belt drive. Or else another type of longitudinal drive is possible, preferably converting a rotary motion to a longitudinal motion.

Preferably at least two separate longitudinal guides are provided in the rotating device to which one gripper each is dedicated. This longitudinal guide may in particular be configured as a linear guide.

Preferably at least one longitudinal guide comprises a curved guide along which the gripping arm is guided for longitudinal movement. A curved guide allows the gripping arm to be in continuously defined alignment relative to the rotary packaging machine respectively the filling spout while exchanging an open-mouth bag during the longitudinal movement so as to prolong the available exchange time.

Preferably at least one gripping arm is provided with at least two holding units to hold the open-mouth bags in two spaced-apart places of the open-mouth bag. An open-mouth bag can for example be held, gripped, or clamped by its upper corners. Two pairs of grippers may for example be provided as holding units to grip the open-mouth bag in two places spaced apart from one another. The holding units used may, other than grippers and clamping jaws, for example be sucking devices, pairs of which form holding units.

In particularly preferred configurations the device comprises a rotary packaging machine for filling open-mouth bags where the rotary packaging machine is equipped with multiple filling units distributed over the circumference and rotating along. Each of the filling units has a filling spout with a bottom filling opening, wherein the open-mouth bags can be appended by way of a motion oriented upwardly relative to the filling spout.

Particularly preferably the open-mouth bags are placed tight onto the filling spouts and in particular sealed prior to filling to reduce or prevent dust from escaping during filling.

The top edges of the open-mouth bags are preferably aligned approximately in a tangent line relative to the circumference of the packaging machine. Then the top corners or edges can be gripped on both sides of the filling spout to append or discharge the open-mouth bag.

In preferred specific embodiments a longitudinal speed of the longitudinal movement of the gripping arm is at least temporarily matched to a peripheral speed of the filling spout. Preferably the gripping arm is disposed on the handling device for linear and/or arcuate movement at least in sections.

In advantageous specific embodiments a curved guide path is substantially similar to a circular arc or circle segment whose center substantially corresponds to a rotation axis of the rotary packaging machine. A distance of the center point of the circular arc from the rotation point of the rotary packaging machine is in particular less than ¼ and in particular less than ⅛ and preferably less than ¹⁄₁₀ of the diameter of the rotary packaging machine. A smaller deviation allows to obtain better synchronization for exchanging.

The circular arc radius preferably corresponds to the distance of the circular arc from the rotation axis of the rotary packaging machine. As a gripping arm moves along a curved guide that can be circumscribed by a circular arc then the gripping arm travels in precise alignment with the filling spout provided on the circumference of the packaging machine. This allows to correspondingly prolong the transfer time.

Preferably the handling device and the rotary packaging machine rotate in opposite sense. Particularly preferably the longitudinal gripping arm movement during appending takes the same sense as the peripheral movement of the filling spout.

Particularly preferably the handling device is provided for transferring open-mouth bags to be filled to a rotary packaging machine. Preferably at least one bag opener is provided. It is possible for the bag opener to be disposed up-stream of the handling device to transfer a pre-opened open-mouth bag to the handling device. Or else it is possible to provide at least one bag opener to rotate along with the handling device. Then the bag opener is in particular provided on the rotating device. In case of a bag opener disposed on a gripping arm the bag opener may open the open-mouth bag even during the rotational movement or in any desired angular position.

In all the configurations it is also preferred to provide at least one handling device for discharging filled open-mouth bags from the rotary packaging machine.

All the configurations preferably provide for an indexed rotation of the rotating device. Particularly preferably the rotary packaging machine rotates continuously. The rotary motions of the rotating device and of the rotary packaging machine are in particular synchronized or matched to one another.

It is possible and preferred to provide at least one gripping arm for vertical movement. It is also possible for the filling spout to be height-adjustable for appending or discharging.

The holding unit of at least one of the gripping arms and/or the gripping arm may be provided height-adjustable by way of swiveling the gripping arm up and down.

The method according to the invention serves to process open-mouth bags, providing a handling device for exchanging bags with a rotary packaging machine. The handling device comprises a rotating device which circulates around the rotation axis of the handling device and is provided with at least two gripping arms for gripping the open-mouth bags. At least two gripping arms move or can be moved separately from one another and substantially transverse to the rotation axis of the rotating device in the longitudinal direction to enable, in addition to the circulating motion around the handling device, a separate longitudinal movement of the gripping arms relative to the rotating device.

The method according to the invention also has many advantages since it allows flexibility in operation. Due to the two gripping arms being disposed for longitudinal movement independently of one another the transfer times can be adapted accordingly when transferring an open-mouth bag to the handling device or when transferring an open-mouth bag from the handling device to a rotary packaging machine.

Preferably at least one gripping arm is provided immovable in the longitudinal direction at least temporarily. It is possible to displace one gripping arm while the other is immovable. It is also possible to displace one gripping arm rapidly while the other gripping arm is nearly stationary or is displaced slowly.

All the configurations preferably provide for synchronization of the rotary motions of the rotating device with those of the rotary packaging machine. The longitudinal movement of the gripping arms is synchronized with the rotary motion of the packaging machine.

Rotation of the rotating device is preferably indexed. When the rotating device is in standstill, a longitudinal movement of at least one gripping arm and in particular exactly one gripping arm is provided in at least one predetermined angular position.

Then the gripping arm is advanced and moved back again in a range of the predetermined angular position before the rotating device arrives at the next angular position or else even continues rotating.

On the whole the present invention provides an advantageous apparatus and an advantageous method for processing open-mouth bags with which to increase the processing speed while at the same time ensuring reliable operation.

Further advantages and features of the present invention can be taken from the exemplary embodiment which will be described below with reference to the present figures.

Figure 2:
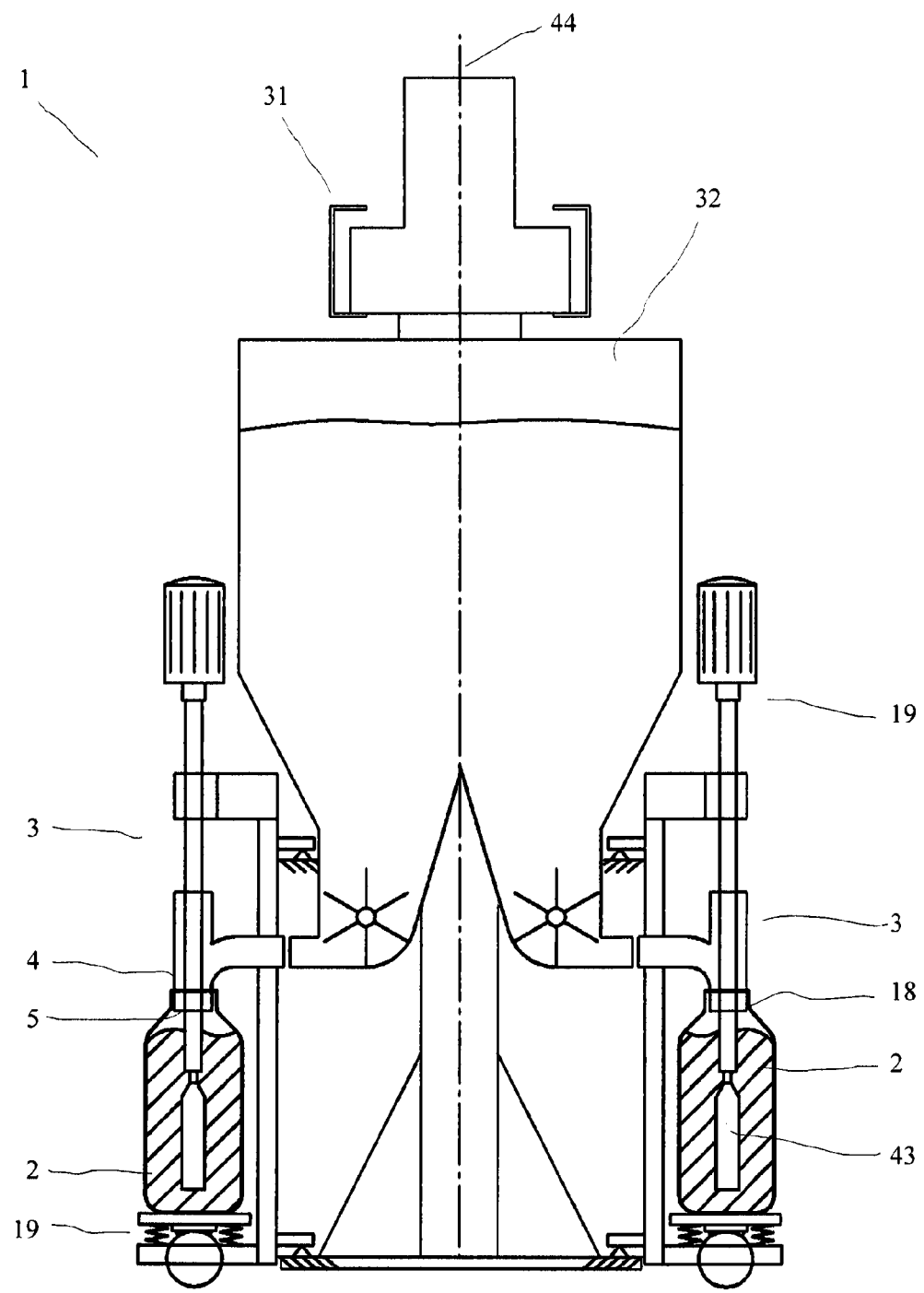
Figures 3, 4:
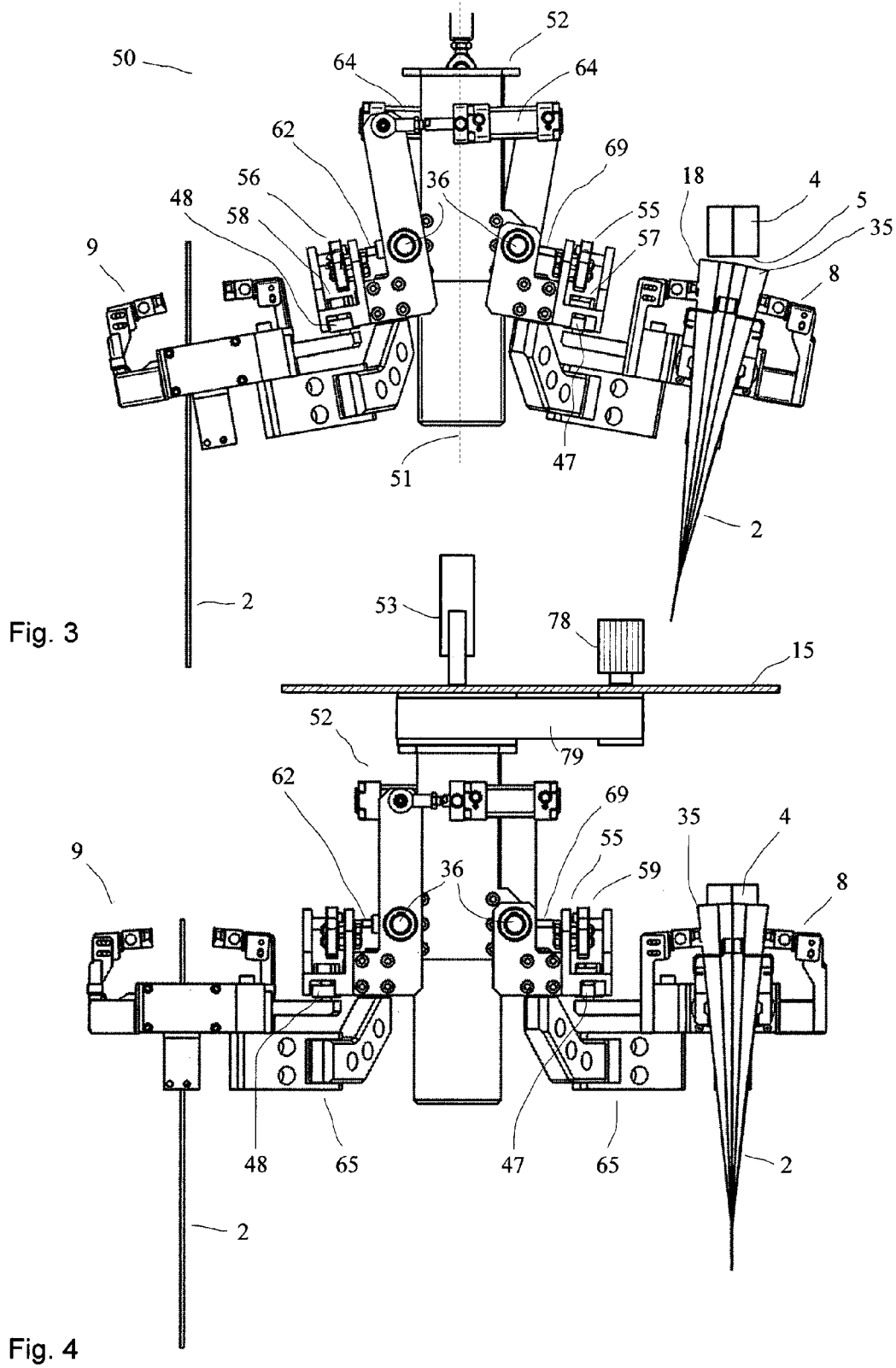
Figure 5:
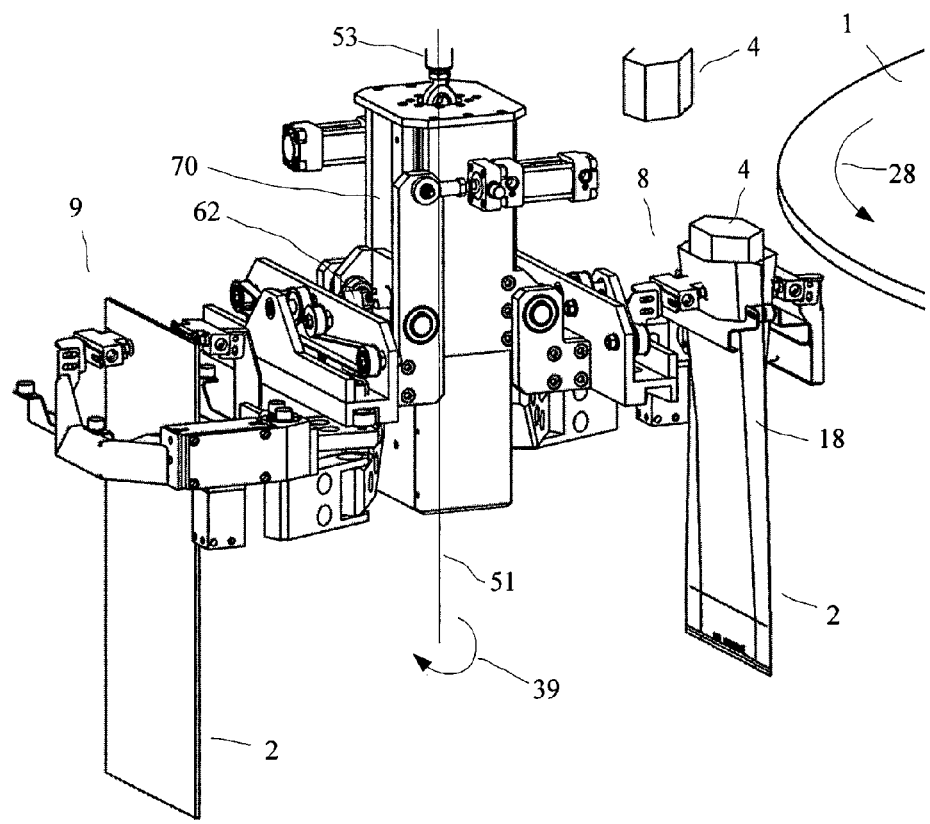
Figure 6:
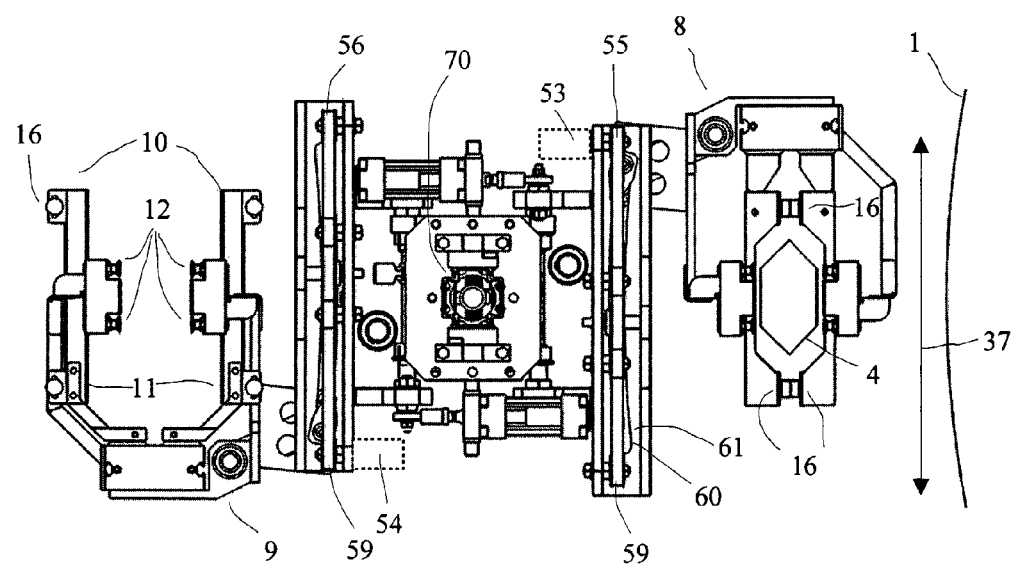
Figure 7:
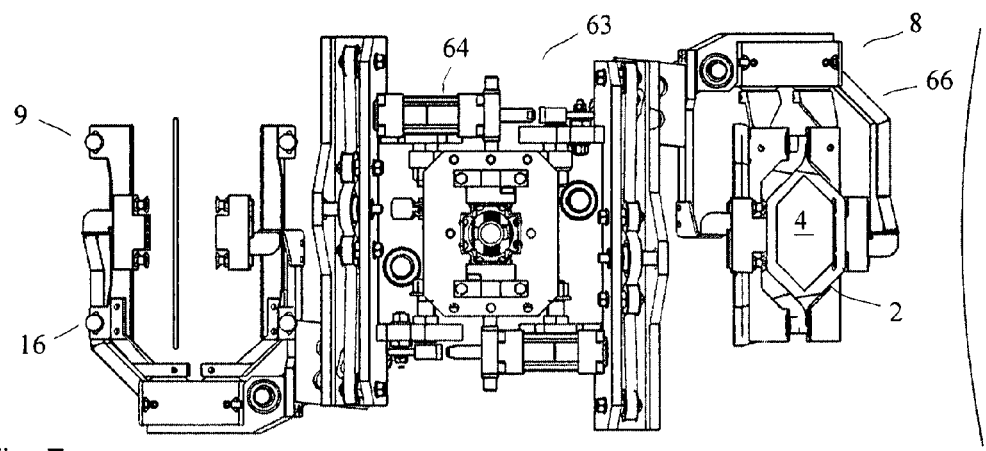
Figure 8:
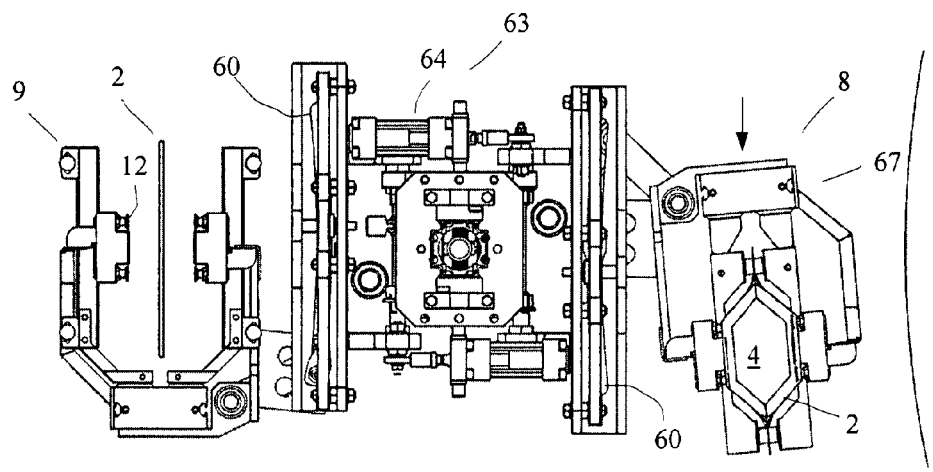
Figure 9:
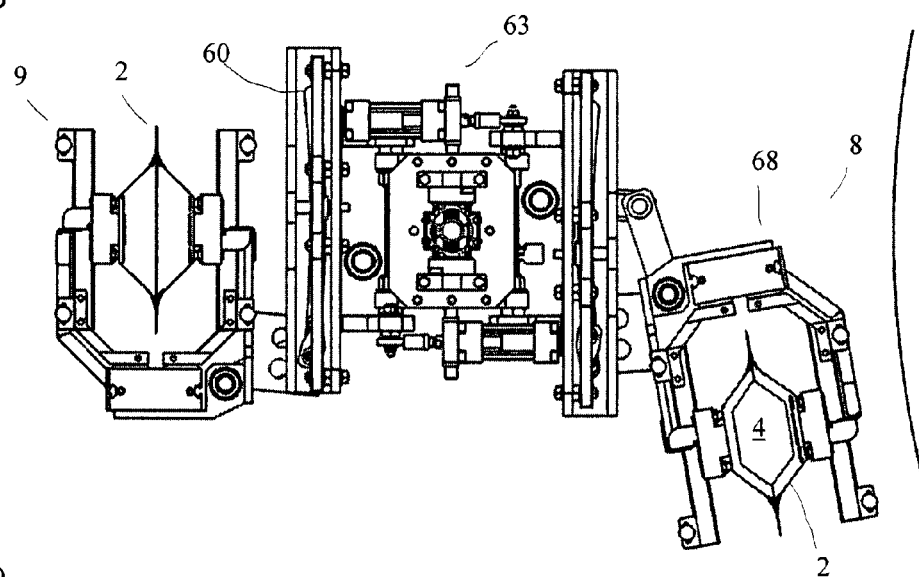
Figure 10:
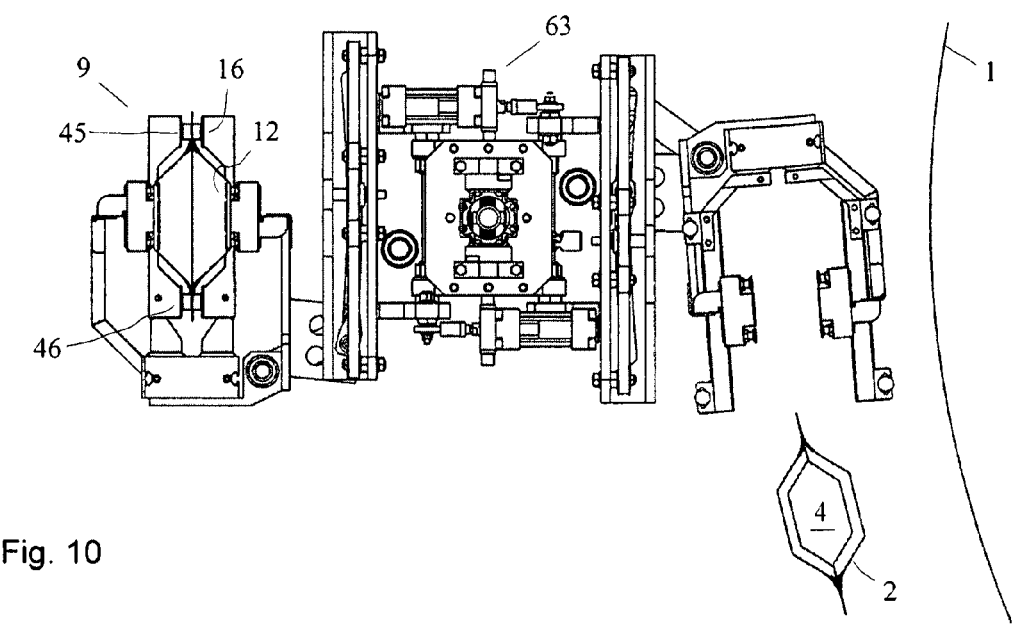
Figure 11:
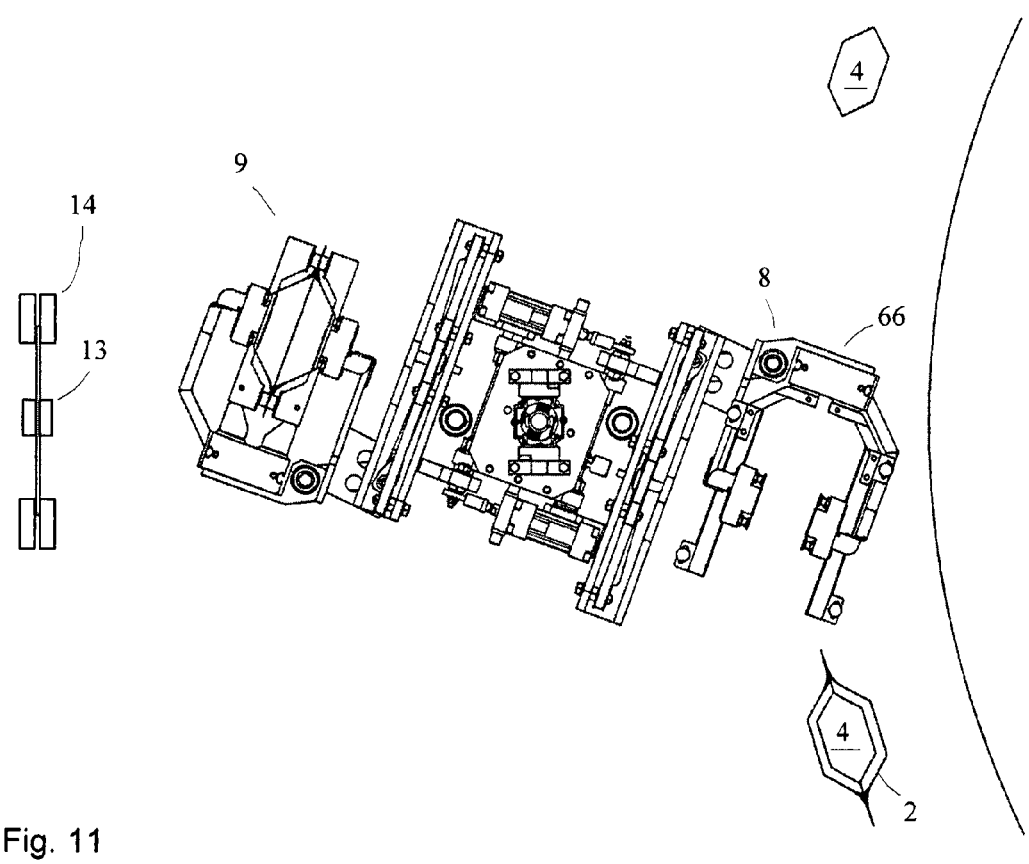
Figure 12:
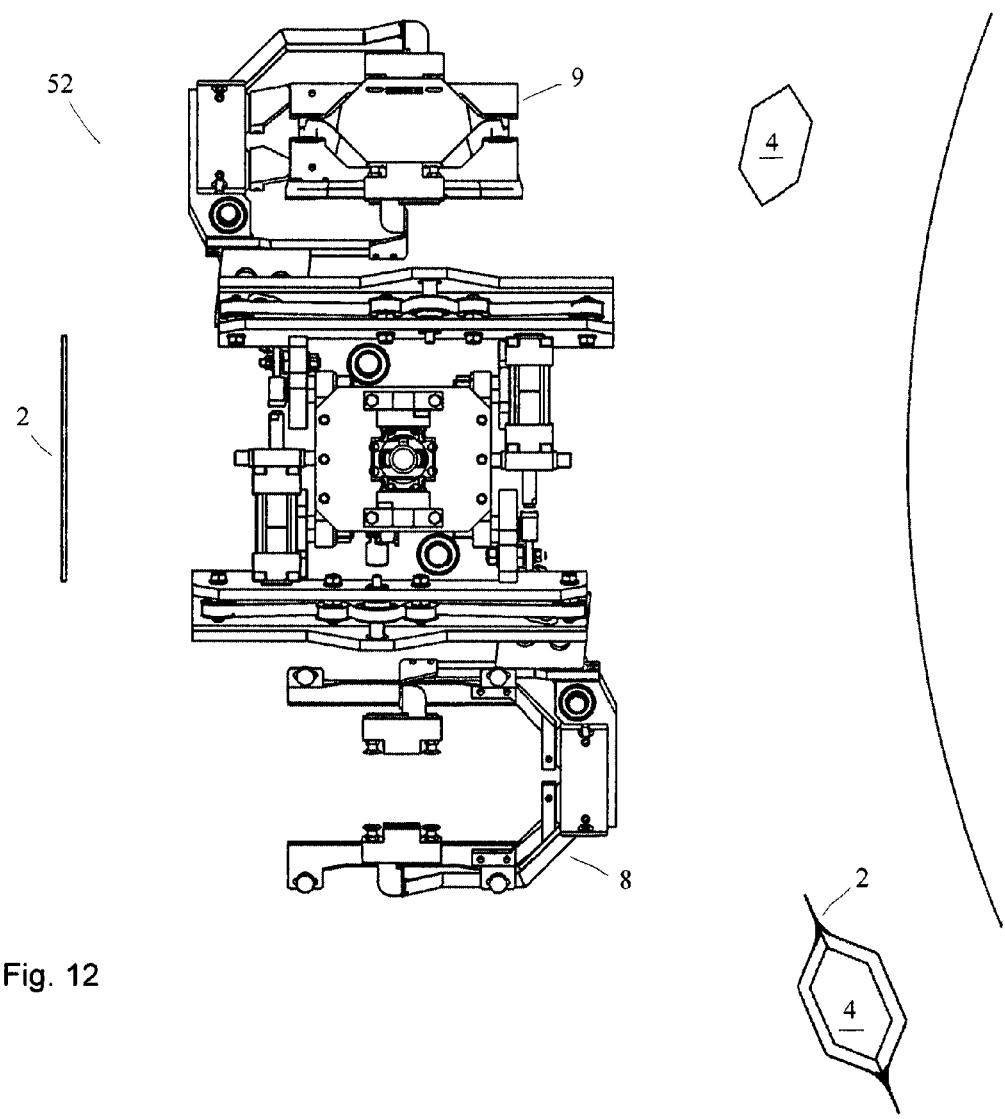
Figure 13:
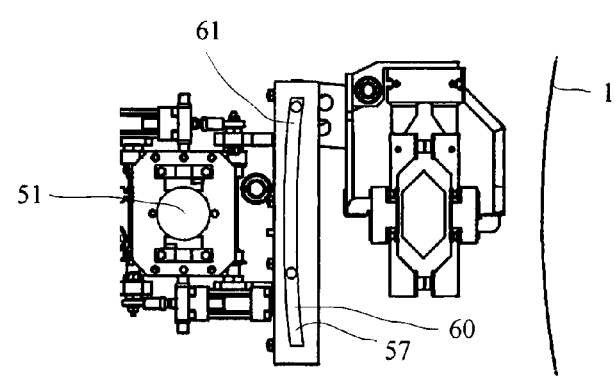
Figure 14:
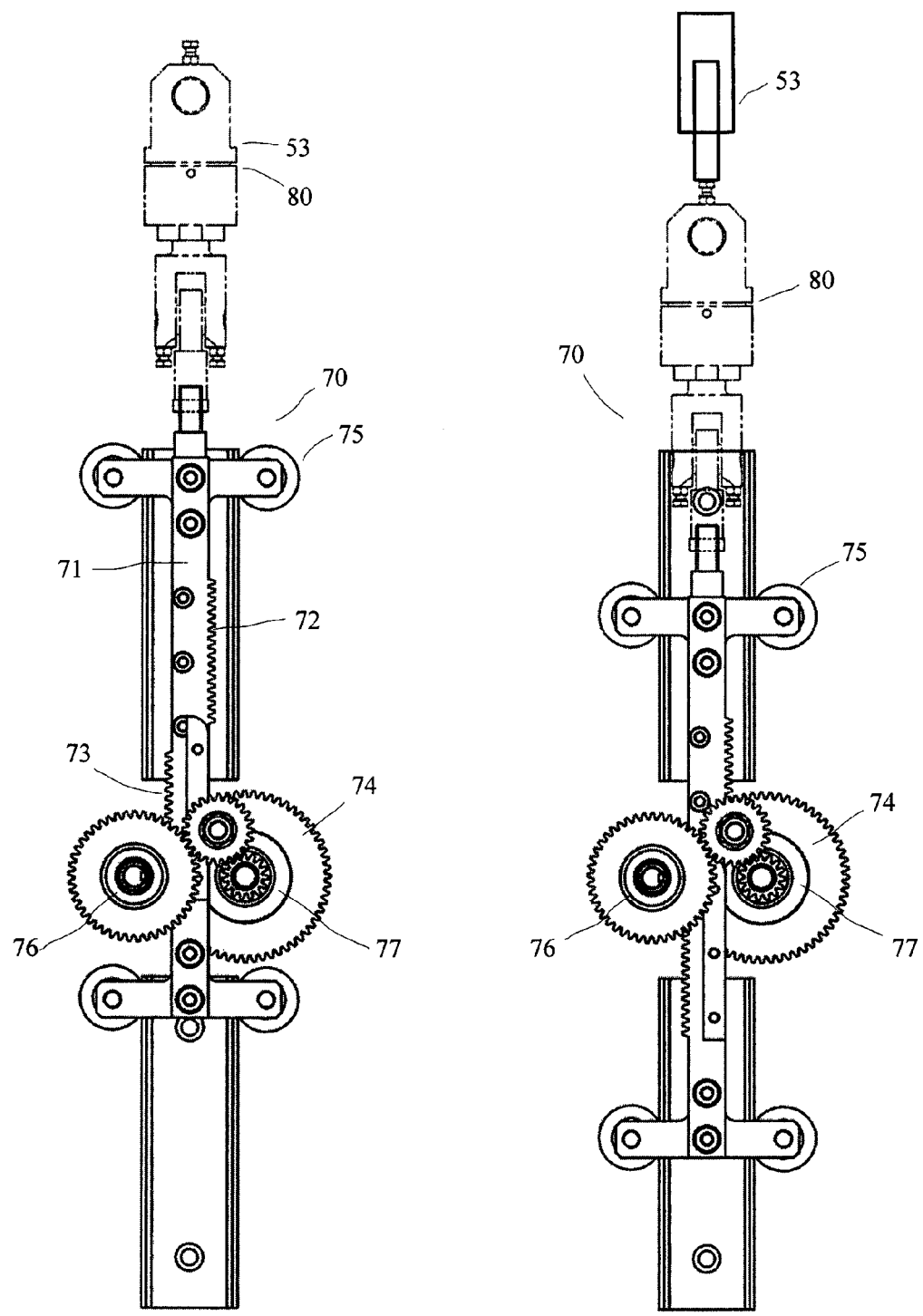

The figures show in:

FIG. 1 a schematic top view of a packaging machine according to the invention;

FIG. 2 a side view of the packaging machine according to FIG. 1;

FIG. 3 a side view of a handling unit in a first position;

FIG. 4 the handling unit in FIG. 3 in a second position;

FIG. 5 the handling unit in FIG. 4 in a perspective illustration;

FIG. 6 a top view of the handling unit in FIG. 4 in a first position;

FIG. 7 the handling unit in FIG. 6 in a second position;

FIG. 8 the handling unit in FIG. 6 in a third position;

FIG. 9 the handling unit in FIG. 6 in a fourth position;

FIG. 10 the handling unit in FIG. 6 in a fifth position;

FIG. 11 the handling unit in FIG. 6 in a sixth position;

FIG. 12 the handling unit in FIG. 6 in another angular position;

FIG. 13 a top view of a detail of the handling device showing the curved guide; and FIG. 14 the coupling device for the handling device in FIG. 3 in two different positions.

With reference to the enclosed figures an exemplary embodiment of an apparatus 100 according to the invention will be discussed below comprising handling devices 40 and 50 and a rotary packaging machine 1.

A schematic top view of the apparatus 100 is illustrated in FIG. 1. The rotary packaging machine 1 serves for filling open-mouth bags 2 (see FIG. 2), being provided with multiple filling units 3 each of which is equipped with a filling spout 4. Between about two and sixteen filling units 3 can be disposed at the illustrated packaging machine 1. Basically it is also possible to install a still larger number of filling units at a rotary packaging machine 1.

The rotary packaging machine 1 is operated rotating continuously so that the filling units 3 rotate about a center axis 44 at substantially constant speed. The speed depends in particular on the product intended to be bagged and its compacting characteristics. The material intended for bagging is fed via an inlet hopper 29 and a silo 32 to the individual filling spouts 4 of the filling units 3.

The filling spouts 4 for filling the open-mouth bags 2 are aligned vertically so that the single filling opening 5 is directed perpendicularly downwardly. Or else it is possible for one or more filling openings to be aligned at an inclination to the vertical. For example an angle of five degrees, ten degrees, or else twenty degrees to the vertical may be provided. Open-mouth bags 2 are appended from beneath to the bottom filling opening 5 of the filling spouts 4.

To this end an open-mouth bag 2 is gripped and the upper bag wall 18 is opened so as to form the upper bag opening 35. Suckers and grippers and/or clamping jaws are preferably used so as to form at the top end of the open-mouth bag 2 a bag opening 35 corresponding to the cross-sectional shape of the filling spout 4. The open-mouth bag 2 is held in a defined position by its top bag wall 18 by means of retaining members such as suckers and/or grippers until the open-mouth bag 2 has been pushed onto the filling spout 4 and is held there again in a defined position by presently not shown retaining members such as grippers and clamping jaws.

The open-mouth bags 2 are placed by way of a transfer device 6 acting as a handling device 50 which is positioned downstream of a bag former 26. The bag former 26 presently manufactures the individual open-mouth bags 2 from a tubular sheet during the continuous operation. Desired lengths are cut off the tubular sheet and the bottom seams are made in the open-mouth bags 2. Or else, pre-fabricated or pre-formed open-mouth bags 2 out of a dispenser may be used.

The open-mouth bags 2 are filled during rotation in the rotational direction 28 which in this instance is counter-clockwise. In other system configurations, clockwise rotation is possible.

Simultaneously the compactors 19 in the shape of vibrating devices or shaking devices 43 that each filling unit 3 is provided with and which are height-adjustable, attain compacting of the product so as to reduce the product level. Due to the product being compacted the open-mouth bags 2 required are on the whole shorter and a tightly filled open-mouth bag 2 is formed that does not only use little sheet material but also offers an optically attractive appearance.

The sheet used for forming the open-mouth bags 2—unlike paper bags—results in a relatively low inherent stiffness of the open-mouth bags 2. Thus, a precisely defined guiding of the open-mouth bags 2 must be ensured at all times to enable comparatively short bag lengths and little bag material overhang as well as safe operation.

When the open-mouth bag 2 is filled with the intended quantity and reaches the angular position of the discharge device 42 acting as a handling device 40, the open-mouth bag 2 is discharged from the filling spout 4. Discharge of the open-mouth bag 2 from the filling spout takes place during the continuous rotation of the packaging machine 1. The discharged bag 2 is transferred by the discharge device 42, which is likewise rotary, to the processing device 41 which comprises a linear guide 21 and one or more closing device(s) 20. The at least one closing device 20 closes the open top of the open-mouth bag 2. In discharge it is again always ensured that holding and guiding the open-mouth bag 2 is defined at all times so that a defined closing of the open-mouth bags 2 can be ensured.

A protective fence 33 may be provided to prevent access to the hazardous zone.

The rotary packaging machine 1 is preferably suspended from a framework 30 with poles 31 supporting the rotary packaging machine. In the upper region of the rotary portion a silo 32 may be provided for intermediate product storage.

Appending the open-mouth bags 2 will now be described in detail.

FIG. 3 shows a simplistic side view of the handling device 50 acting as a transfer device 6 and a filling spout 4 of the packaging machine 1. For the sake of clarity not all the components are illustrated.

FIG. 3 shows only one single filling spout 4 of the packaging machine 1. The handling unit 50 is configured as a transfer device 6. The handling device 50 is generally hung from a framework not illustrated in FIG. 3 and comprises a rotating device 52 on which exactly two gripping arms 8 and 9 are disposed. As the rotating device 52 rotates the gripping arms 8 and 9 rotate along with the rotating device 52.

Additionally, the gripping arms 8 and 9 are disposed to move separately from one another along longitudinal guides 57 and 58. The gripping arms 8 and 9 are moved by way of movement devices 55 and 56 along the longitudinal guides 57 and 58. The movement devices 55 and 56 comprise a belt drive 59 each. Controlled rotation of the belt drives 59 allows defined movement of the respective gripping arm 8, 9 in the longitudinal direction 37.

In the position shown in FIG. 3 the gripping arms 8 and 9 are shown in a lowered position, having pivoted downwardly about the pivot axes 36. The pivoting motion is controlled by means of two separate pivot cylinders 64. The gripping arm 9 is positioned just prior to taking over a new open-mouth bag 2 intended for filling which a bag feeding unit 14, not illustrated in FIG. 3, will transfer to the gripping arm 9. It is possible to provide the bag feeding unit 14 with a bag opener 13. Or else it is possible to open the bag in the transfer device 6 acting as a handling device 50.

In the position illustrated in FIG. 3 the gripping arm 8 holds an opened bag 2 that can be appended by its bag opening 35 to a filling spout 4 of a rotary packaging machine 1. The open-mouth bag 2 is moved upwardly from beneath by way of an upwardly movement across the filling opening 5 of the filling spout 4 so as to obtain the appended situation shown in FIG. 4. Additionally the gripping arm 8 is displaced in the longitudinal direction in appending so that the gripping arm 8 with the bag opening 35 of the open-mouth bag 2 is located exactly beneath the filling spout 4 of the rotary packaging machine 1 over a considerable angular section. In this way, as the gripping arm 8 swivels upwardly via the pivot cylinder 64, there is sufficient time to ensure optimal transfer of the open-mouth bag 2 to the filling spout 4.

In displacing the gripping arm 8 in the longitudinal direction the gripping arm is guided in the longitudinal guide 57 by means of two rollers 47. The two rollers are disposed in line, prohibiting rotation of the gripping arm 8 relative to the longitudinal guide 57 and moreover obtaining parallel alignment of the gripping arm 8 relative to the longitudinal guide 57. The longitudinal guide may be linear although in this instance it is configured curved.

Accordingly the longitudinal guide 58 of the gripping arm 9 is provided with two rollers 48 disposed in line so that the gripping arm 9 is guided in the longitudinal guide 58. During longitudinal movement the rollers 47 and 48 roll off in their respective longitudinal guide 57, 58.

FIG. 4 shows the situation with the bag opening 35 pulled across the filling spout 4.

The swivel arms 8 and 9 are retained for longitudinal movement in an approximately horizontal plane by way of swivel members 65.

A common driving device 53 drives the movement devices 55 and 56. The entire handling device 50 is supported on the framework 15 shown in portions only and which may be installed stationary. The framework 15 is provided with a motor 78 for driving the rotating device 52 via a belt drive 79. The driving device 53 is provided non-rotatable on the framework 15. This driving device 53 is an electric cylinder allowing controlled extending movement. A coupling device 70, not visible in FIG. 4, converts the linear movement of the cylinder rod to a rotary motion by extending the piston rod. Flexible shafts or cardan joints 62 and 69 transmit the rotation to the movement devices 55 and 56, selectively or by automatic control, so as to obtain controlled longitudinal motion of the gripping arms 8 and 9.

FIG. 5 shows a perspective and simplistic illustration of the handling device 50 configured as a transfer device 6 immediately following placement of an open-mouth bag 2 to a filling spout 4 of the rotary packaging machine 1. Thus the FIG. 5 illustrates a perspective illustration of the situation according to FIG. 4.

In FIG. 5 one can identify a cardan joint 62 with which the belt drive 59 acting as a movement device 56 is connected with a driving device 53 not recognizable in detail in FIG. 5. In analogy the gripping arm 8 is connected with a driving device via a corresponding cardan joint or a flexible shaft or the like. The belt drive 59 of the longitudinal guide 58 allows moving the gripping arm 9 back and forth in the longitudinal direction 37. Accordingly the movement device 55 allows to move the gripping arm 8 back and forth in the longitudinal direction.

FIG. 6 shows a top view of the handling device 50 configured as a transfer device 6 in a first position. For better clarity the illustration according to FIG. 6 does not illustrate any open-mouth bags.

The gripping arm 8 is located immediately beneath a filling spout 4. The gripping arm 9 is located in the proper position for taking over a new bag from a bag feeding unit.

The open-mouth bags 2 intended for filling may be manufactured in an upstream bag former so that open-mouth bags 2 of precisely matched bag dimensions are available at any time.

Each of the gripping arms 8, 9 is provided with holding units 10 and 11 intended to grasp an open-mouth bag 2 in spaced-apart places 45, 46 (FIG. 10) or positions so as to enable a spatially defined transfer of the open-mouth bags 2. Each of the holding units 10, 11 is provided with at least one pair of retaining members each. For example a pair of grippers having two grippers or a pair of clamping jaws having two or more clamping jaws 16 may be provided by way of which a holding unit 10 retains the open-mouth bag 2 in one place 45, 46.

It is possible to provide a separate driving device 53, 54 for each gripping arm 8, 9. Then for example the driving device 53 serves to drive the movement device 55, thus causing rotation of the belt drive 59, thus in turn causing the gripping arm 8 to move in the longitudinal direction 37. The gripping arm 8 can be moved back and forth between front and rear end positions.

Accordingly the gripping arm 9 may be provided with a driving device 54 which allows longitudinal movement of the gripping arm 9.

Alternatively a coupling device 70 may be provided with which a common driving device 53 is coupled to one of the gripping arms 8 or the other of the gripping arms 9 or to both of the gripping arms 8, 9, selectively or according to a predetermined sequence pattern. In all the cases separate longitudinal movements of the gripping arms 8, 9 are possible, independently of one another.

FIG. 7 shows the handling device 50 where the open-mouth bag 2 is held by the gripping arm 8 immediately prior to transfer to the filling spout 4. The opened open-mouth bag 2 is located immediately under the filling spout 4 in a downwardly pivoted position as illustrated in FIG. 3. In this angular position 63 the gripping arm is accelerated in the longitudinal direction 37 so that the gripping arm 8 with the bag opening 35 remains beneath the filling spout 4 at all times. At the same time during the longitudinal movement the curved guide 60 causes the gripping arm 8 to swivel along so that the gripping arm 8 swivels along beneath the filling spout 4 corresponding to the rotary movement of the filling spout 4. In this way the gripping arm 8 is oriented in a tangent line relative to the packaging machine at all times. When the gripping arm 8 moves from the rear position 66 (see FIG. 7) through the intermediate position 67 (see FIG. 8) to the front position 68 (see FIG. 9), the other gripping arm 9 remains stationary. At the same time the next open-mouth bag 2 is transferred to the gripping arm 9. The opening 35 of the open-mouth bag 2 may occur through a separate bag opener or else opening occurs at the gripping arm 9.

Finally in FIG. 9 the open-mouth bag 2 is appended to the filling spout 4.

As shown in FIG. 10, the gripping arm 8 is then returned from the front position 68 via the intermediate position 67 to the rear position 66 to prevent the gripping arm 8 from colliding with the filling spout 4, to which the open-mouth bag 2 has just now been appended, while the handling device 50 rotates further clockwise in the rotational direction 39. Moreover the gripping arm 8 must return to the base position before the gripping arm 8 appends the next open-mouth bag 2.

A higher clock rate can be obtained by returning the gripping arm 8 in the longitudinal direction from the front position 68 to the rear position 66 before the handling device 50 continues rotating.

As becomes apparent in FIG. 11, in the position according to FIG. 11 the further rotation of the handling device 50 involves no collision with the filling spout 4 or with the appended open-mouth bag 2 since the gripping arm 8 is back in the rear position 66.

On the other side there had been sufficient time for the gripping arm 9 for defined takeover of the next open-mouth bag 2 from the bag feeding unit 13 and optionally for opening it. This open-mouth bag has been pre-opened by the upstream bag opener 13. This allows to ensure a clearly defined guiding of the open-mouth bags at all times.

FIG. 12 shows an angular position rotated 90° in which the gripping arm 9 is waiting to transfer the open-mouth bag 2 to the next filling spout 4.

FIG. 13 shows a partial top view of the handling device 50 with the curved guide 60 visible as a longitudinal guide 57 of the gripping arm 8. The curved guide 60 shows the path of a circular arc 61 whose center point corresponds to the rotation axis of the rotary packaging machine 1 or else is disposed adjacent to the rotation axis 44 of the rotary packaging machine 1.

FIG. 14 shows the function of the coupling device 70 which converts the linear movement of the driving device 53 to rotary motions. The coupling device 70 is provided with a toothed rack 71 both sides of which are provided with toothings 72 and 73. The toothing 72 is provided for longitudinal adjustment of the movement device of the gripping arm 8. The toothing 73 causes longitudinal movement of the gripping arm 9 through rotation of the gear wheels 74. Suitable arrangement of the toothings 72 and 73 allows to adjust independently of one another both the gripping arm 8 and the other gripping arm 9 in the longitudinal direction 37. Rotational movement is advantageously converted through the belt drives 59 to respective longitudinal movements of the two gripping arms 8, 9. Suitable locking devices may be provided to reliably prevent unintentional rotation of the drive shafts 76, 77 on the side on that side where the toothing is not in engagement and must consequently not be displaced.

Guide rollers 75 serve for guiding so that the toothed rack 71 and thus its toothings 72 and 73 are retained in defined positions relative to the gear wheels 74. The toothed rack 71 is disposed in a central region of the rotation axis 51 of the rotating device 52. The driving device 53 is coupled via a swivel joint 80. The swivel joint 80 allows the coupling device 70 and also the rotating device 52 to rotate while the driving device 53 is disposed stationary.

Using the coupling device 70 allows to advantageously achieve a simple structure where the longitudinal movements of the two gripping arms 8, 9 in the rotating device 52 only require one common drive 53. A longitudinal displacement of the toothed rack 71 allows—depending on the position of the toothed rack 71 relative to the gear wheels 74—precisely matched rotational movements of the belt drives 59 of the two gripping arms, providing movements synchronized with the rotation speed of the rotary packaging machine. The driven shaft 76 is coupled with the movement device 55 via a flexible shaft or a cardan joint 69 so that as the corresponding toothed wheel engages the toothed rack, a longitudinal movement of the driving device 53 is converted to rotational movement of the driven shaft 76 and thus to rotational movement of the movement device 55 which then causes longitudinal movement of the gripping arm 8. In analogy, longitudinal movement of the driving device 53 can be converted to longitudinal movement of the gripping arm 9.

On the whole the invention provides an apparatus 100 with a handling device 50 and/or 40 and optionally a rotary packaging machine 1 allowing high throughput.

| List of reference numerals: | |
|---|---|
| 1 | rotary packaging machine |
| 2 | open-mouth bag |
| 3 | filling unit |
| 4 | filling spout |
| 5 | filling opening |
| 6 | transfer device |
| 8 | gripping arm |
| 9 | gripping arm |
| 10 | holding unit, gripping unit |
| 11 | holding unit, gripping unit |
| 12 | sucking device |
| 13 | bag opener |
| 14 | bag feeding unit |
| 15 | framework |
| 16 | clamping jaw |
| 18 | bag wall |
| 19 | compactor |
| 20 | closing device |
| 21 | linear guide |
| 26 | bag former |
| 28 | rotational direction of 1 |
| 29 | inlet hopper |
| 30 | framework |
| 31 | support |
| 32 | silo |
| 33 | protective fence |
| 35 | bag opening |
| 36 | pivot axis |
| 37 | longitudinal direction |
| 39 | rotational direction of 50 |
| 40 | handling device |
| 41 | processing device |
| 42 | discharge device |
| 43 | poker vibrator |
| 44 | rotation axis of 1 |
| 45 | place |
| 46 | place |
| 47 | rollers |
| 48 | rollers |
| 50 | handling device |
| 51 | rotation axis of 52 |
| 52 | rotating device |
| 53 | driving device |
| 54 | driving device |
| 55 | movement device |

| List of reference numerals: | |
|---|---|
| 56 | movement device |
| 57 | longitudinal guide |
| 58 | longitudinal guide |
| 59 | belt drive |
| 60 | curved guide |
| 61 | circular arc |
| 62 | cardan joint |
| 63 | angular position |
| 64 | swivel cylinder |
| 65 | swivel member |
| 66 | rear position |
| 67 | intermediate position |
| 68 | front position |
| 69 | cardan joint |
| 70 | coupling device |
| 71 | toothed rack |
| 72 | toothing |
| 73 | toothing |
| 74 | toothed wheel |
| 75 | guide roll |
| 76 | driven shaft for 55 |
| 77 | driven shaft for 56 |
| 78 | motor |
| 79 | drive belt |
| 80 | swivel joint |
| 100 | apparatus |

The invention claimed is:

1. Apparatus for processing open-mouth bags comprising a handling device for exchanging open-mouth bags with a rotary packaging machine, the handling device comprising at least one rotating device circulating around a rotation axis of the handling device where at least two gripping arms are disposed for gripping the open-mouth bags, characterized in that at least two gripping arms are disposed separately from one another for longitudinal movement substantially transverse to the rotation axis of the rotating device to allow, in addition to the circulating motion around the handling device, longitudinal movement of the gripping arms relative to the rotating device.

2. The apparatus according to claim 1 wherein at least one driving device is provided for the longitudinal movement of at least one of the gripping arms and in particular of at least two gripping arms.

3. The apparatus according to claim 2 wherein the driving device can be coupled to at least one movement device via at least one coupling device for longitudinal movement of the gripping arm.

4. The apparatus according to claim 3 wherein the coupling device is configured to couple the driving device to at least two different movement devices.

5. The apparatus according to claim 4 wherein at least one movement device comprises a belt drive.

6. The apparatus according to claim 1 wherein at least two separate longitudinal guides are provided on the rotating device to which at least one gripping arm each is assigned.

7. The apparatus according to claim 6 wherein at least one longitudinal guide comprises a curved guide in which the gripping arm is guided for longitudinal movement.

8. The apparatus according to claim 1 wherein at least one gripping arm comprises at least two holding units to hold each of the open-mouth bags in two spaced-apart places of the open-mouth bag.

9. The apparatus according to claim 1 comprising the rotary packaging machine for filling the open-mouth bags having multiple filling units disposed over the circumference and rotating along, each of which having a filling spout with a bottom filling opening wherein the open-mouth bags can be appended by way of upwardly movement relative to the filling spout.

10. The apparatus according to claim 9 wherein a longitudinal speed of the longitudinal movement of the gripping arm is at least temporarily matched to a peripheral speed of the peripheral movement of the filling spouts and wherein the gripping arm is disposed on the handling device for linear and/or arcuate movement at least in sections.

11. The apparatus according to claim 7 wherein a path of the curved guide substantially corresponds to a circular arc whose center substantially corresponds to a rotation axis of the rotary packaging machine.

12. The apparatus according to claim 1 wherein the handling device and the rotary packaging machine rotate in opposite senses.

13. The apparatus according to claim 1 wherein the handling device is provided for transferring the open-mouth bags intended for filling to the rotary packaging machine and wherein at least one bag opener is provided.

14. The apparatus according to claim 13 wherein the bag opener is disposed upstream of the handling device and transfers the opened open-mouth bag to the handling device and/or wherein at least one bag opener is provided for rotating along on the handling device and in particular on the rotating device.

15. The apparatus according to claim 1 wherein a handling device is provided for discharging filled open-mouth bags from the rotary packaging machine.

16. The apparatus according to claim 1 wherein the rotating device rotates indexed and/or wherein the rotary packaging machine rotates continuously and/or wherein the rotational movements of the rotating device and of the rotary packaging machine are synchronized.

17. The apparatus according to claim 1 wherein at least one gripping arm is provided height-adjustable and/or wherein a filling spout is height-adjustable for appending.

18. The apparatus according to claim 17 wherein a holding unit of at least one gripping arm is height-adjustable by swiveling the gripping arm up and down.

19. Method for processing open-mouth bags comprising a handling device for exchanging open-mouth bags with a rotary packaging machine, the handling device comprising at least one rotating device circulating around a rotation axis of the handling device where at least two gripping arms are disposed for gripping the open-mouth bags, characterized in that at least two gripping arms can be moved separately from one another in the longitudinal direction and substantially transverse to the rotation axis of the rotating device to allow, in addition to the circulating motion around the handling device , separate longitudinal movements of the gripping arms relative to one another and relative to the rotating device.

20. The method according to claim 19 wherein at least one gripping arm is at least temporarily displaced in the longitudinal direction independently of another gripping arm.

21. The method according to claim 19 wherein the gripping arm is at least temporarily immovable in the longitudinal direction.

22. The method according to claim 19 wherein the rotational movements of the rotating device and the rotary packaging machine are synchronized.

23. The method according to claim 19 wherein the rotating device rotates indexed and wherein, when the rotating device is in standstill, the gripping arm moves longitudinally at least in one predetermined angular position.

24. The method according to claim 23 wherein the gripping arm is advanced and moved back in a range of the predetermined angular position.

* * * * *